US007036427B2

(12) United States Patent
Letendre et al.

(10) Patent No.: US 7,036,427 B2
(45) Date of Patent: May 2, 2006

(54) RISING CRUST MANUFACTURING APPARATUS

(75) Inventors: Daniel Letendre, Laval (CA); Marc Hallée, St-Hubert (CA)

(73) Assignee: Les Aliments T & N Foods Inc., Lachine (CA)

( * ) Notice: Subject to any disclaimer, the term of this patent is extended or adjusted under 35 U.S.C. 154(b) by 461 days.

(21) Appl. No.: 10/293,314

(22) Filed: Nov. 14, 2002

(65) Prior Publication Data
US 2003/0099749 A1 May 29, 2003

(30) Foreign Application Priority Data
Nov. 29, 2001 (CA) ................................ 2364143

(51) Int. Cl.
*A21C 13/00* (2006.01)
(52) U.S. Cl. ..................... 99/450.2; 221/211
(58) Field of Classification Search .... 99/450.1–450.3; 426/500–502; D7/686; 221/211
See application file for complete search history.

(56) References Cited

U.S. PATENT DOCUMENTS

| 59,313 | A | * | 10/1866 | Wilson | 473/564 |
|---|---|---|---|---|---|
| 4,661,361 | A | * | 4/1987 | Mongiello et al. | 426/283 |
| 4,769,252 | A | * | 9/1988 | Escamilla | 426/496 |
| 5,445,840 | A | * | 8/1995 | Wadell | 426/297 |
| 5,640,897 | A | * | 6/1997 | Fehr | 99/450.1 |
| 5,756,138 | A | * | 5/1998 | Milohanic | 426/231 |
| 5,865,107 | A | * | 2/1999 | Sanguinetti et al. | 99/450.6 |
| 5,912,035 | A | * | 6/1999 | Grat | 426/297 |
| 6,479,087 | B1 | * | 11/2002 | Cole et al. | 426/283 |
| 6,626,091 | B1 | * | 9/2003 | Lopresti et al. | 99/450.1 |

OTHER PUBLICATIONS

RD 417040A, Jan. 1999, Gilardi et al.*

* cited by examiner

*Primary Examiner*—Drew Becker
(74) *Attorney, Agent, or Firm*—Ogilvy Renault

(57) ABSTRACT

An apparatus for forming a rising crust comprises a dough-manipulating unit adapted to apply a vacuum at the peripheral edge portion of an underlying sheet of dough to hold and lift the peripheral portion. The manipulating unit is inwardly contractible while holding the peripheral edge portion of the sheet of dough and movable downwardly while being in a contracted state to provide for the formation of a peripheral fold in the sheet of dough. The dough-manipulating unit allows for high volume production of rising crust pizzas.

20 Claims, 3 Drawing Sheets

RISING CRUST MANUFACTURING APPARATUS

BACKGROUND OF THE INVENTION

1. Field of the Invention

The present invention relates generally to food products and, more particularly, to a method and an apparatus for preparing a rising crust from a sheet of dough.

2. Description of the Prior Art

Originally, pizza pies were made by hand. With the increasing demand, various devices have been developed to allow a pizza to be made in large-scale production assemblies, frozen or freeze-dried before packaging, and shipped to grocers nationwide.

In large scale, commercial bakeries, pizza crusts are typically formed in a press comprising a die that can be operated to apply pressure onto a dough ball to flatten the dough ball into a circular, square or rectangular sheet of dough. Cavities can be defined in the die to form corresponding raised ridges in the dough.

While high volume pizza processing machines allow for the formation of a raised ridge around the outer peripheral edge of a pizza pie, they suffer from several drawbacks. Often the so formed industrial crust will have a poor flavor and taste as compared to a hand-made pizza crust. Unlike hand-made dough pizza, the peripheral ridge of dough formed by pressing will often not raise during the baking process.

There is therefore a need for a new high volume processing method and apparatus for use in the preparation of rising crust pizzas.

SUMMARY OF THE INVENTION

It is therefore an aim of the present invention to provide an apparatus for forming pizza dough with a ridge or crust that will rise when baked.

It is a further aim of the present invention to produce a rising crust that is close in taste and texture to a hand-made rising crust.

Therefore, in accordance with the present invention, there is provided an apparatus for use in the preparation of a rising crust from a sheet of dough having a peripheral edge portion, the apparatus comprising a dough manipulating unit for lifting from above the peripheral edge portion of an underlying sheet of dough, the manipulating unit being inwardly contractible while holding the peripheral edge portion of the sheet of dough and movable downwardly while being in a contracted state to provide for the formation of a peripheral fold in the sheet of dough.

In accordance with a further general aspect of the present invention, there is provided a method of forming a contour ridge on a sheet of dough, comprising the steps of: applying a vacuum at a peripheral portion of a sheet of dough to hold the peripheral portion and allow it to be lifted from a support surface, bringing the lifted peripheral portion inwardly towards a central portion of the sheet of dough so as to form a Z-shaped fold, and pressing down the Z-shaped fold.

In accordance with a still further general aspect of the present invention, there is provided an apparatus for forming a contour ridge in a sheet of dough, the apparatus comprising a folding station whereat a peripheral edge of the sheet of dough is folded over inwardly to form a peripheral fold, a rolling station whereat the peripheral fold is rolled in to create a double fold, a pressing station for pinching the double fold to prevent the fold from subsequently unrolling, and a conveyor for moving the sheet of dough from one station to another.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
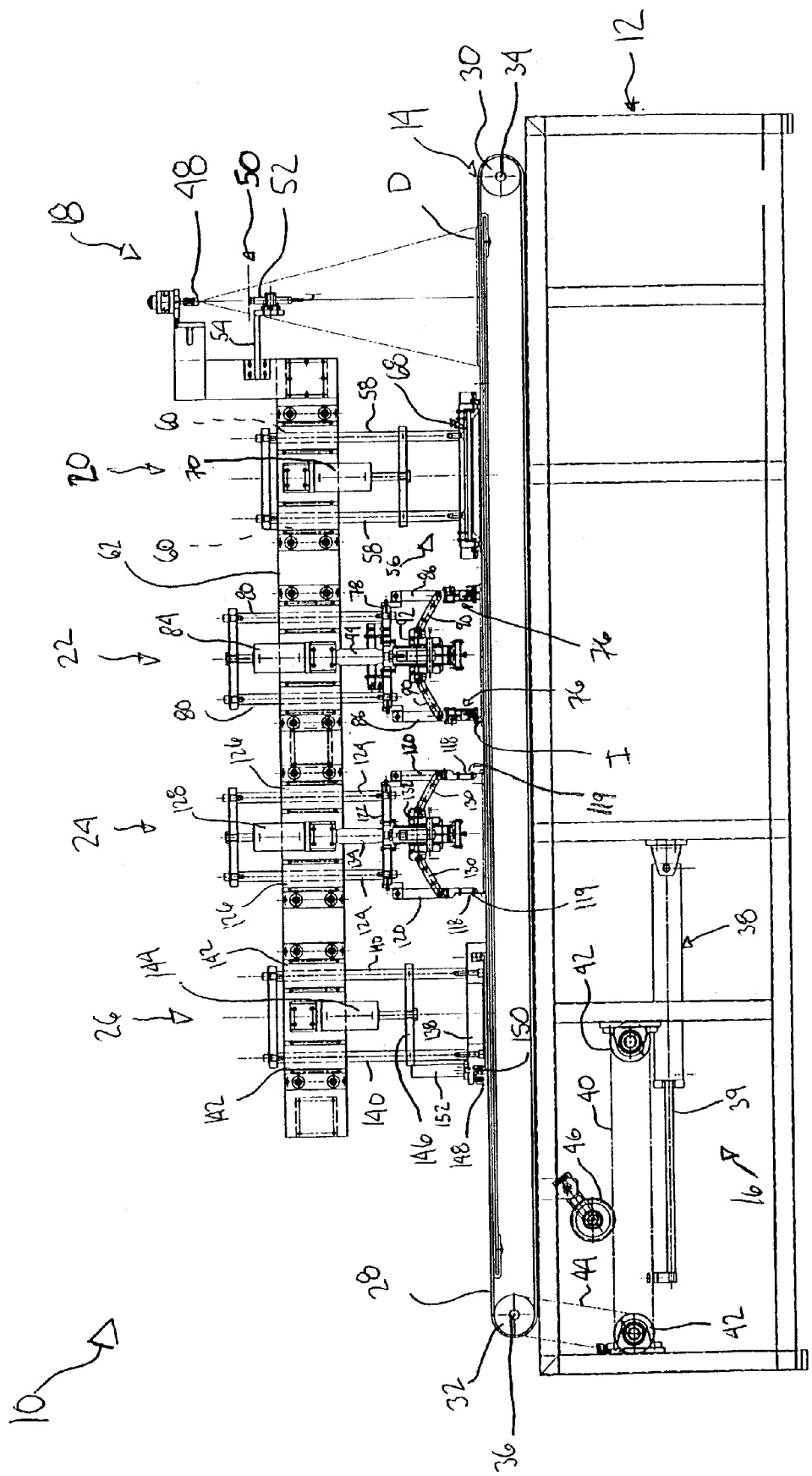
FIG. 1 is a side view of an apparatus for forming a rising crust from a sheet of dough in accordance with a first embodiment of the present invention.

FIG. 1 illustrates an apparatus 10 suited for use in the preparation of pizza crusts from raw dough sheets. As will be seen hereinafter, the apparatus 10 provides for the formation of a contour ridge in the form of a roll edge of dough or a peripheral piped flange of dough around the periphery of the dough sheet. The piped flange is made by folding the outer edge of the sheet of dough D (FIG. 3) inwardly and by subsequently rolling in the so formed peripheral fold so as to create a contour ridge that, unlike dough ridges made by pressing, will rise during baking, thereby providing for the production of so called rising crust pizza.

The apparatus 10 generally comprises a frame 12, a conveyor belt 14 supported by the frame 12 and driven by an indexing mechanism 16 for sequentially carrying successive dough sheets from a positioning station 18 to a cutting station 20, a dough folding station 22, a dough rolling station 24, and to a pressing station 26.

The conveyor belt 14 preferably comprises an endless Nylon belt 28 offering a smooth conveying surface for the sheets of dough D. According to a preferred embodiment of the present invention, the endless belt 28 has a 16 inches width. The belt 28 extends over a tension roller 30 and a driven roller 32 respectively mounted at an upstream end and a downstream end of the apparatus 10. The rollers 30 and 32 are mounted on respective shafts 34 and 36. A braking mechanism (not shown) is mounted on the shaft 34 of the tension roller 30 to act against the inertia that the belt 28 may have after having been indexed by the indexing mechanism 16.

The indexing mechanism 16 comprises a pneumatic cylinder 38 having an 18 inches stroke. The pneumatic cylinder 38 has a reciprocating piston 39 drivingly engaged at a distal end thereof with a first toothed belt 40 extending over a pair of idle pulleys 42 journaled to the frame 12 underneath the conveyor belt 14. The movement communicated to the first toothed belt 40, when the piston 39 is retracted, is transmitted to the shaft 36 and ,thus, the driven roller 32 of the conveyor belt 14 by a second toothed belt 44 operatively engaged with a pulley (not shown) mounted to the shaft 36. A one-way clutch (not shown) is provided between the belts 40 and 44 to prevent that the movement imparted to the belt 40, when the piston 39 is extended, be transmitted to the conveyor belt 14. A tension roller 46 is provided to maintain an appropriate tension in the toothed belt 40. The above-described indexing mechanism 16 provides for the sheets of dough D on the belt 28 to be incrementally advanced under the action of the pneumatic cylinder 38 towards the downstream end of the apparatus 10 by a predetermined distance (18 inches) each time the piston 39 is retracted. However, when the piston 39 is extended, no movement is transmitted to the belt 28 because of the one-way clutch. It is understood that other indexing mechanism could be used as well.

The positioning station 18 is located at the upstream end of the apparatus 10 and essentially comprises a laser source 48 and a mirror 50 mounted to a drum 52, which is, in turn, adjustably mounted to a cantilever arm 54. The mirror 50 is slightly inclined and is rotated upon itself by an air motor (not shown) so as to reflect the laser beam generated by the laser source 48 into a luminous circle on the underlying top surface of the belt 28. The diameter of the circle projected onto the belt 28 can be adjusted by varying the vertical position of the drum 52 relative to the belt 28. According to a preferred embodiment of the present invention, the diameter of the circle is 14.50 inches. The generation of a luminous circle onto the belt 28 allows an operator to manually place a sheet of dough D on the belt 28 in a predetermined position so that when the sheet of dough D is subsequently incrementally advanced by the conveyor belt 14, the dough sheet D will be accurately positioned with respect to the cutting station 20, the folding station 22, the rolling station 24 and the pressing station 26.

Figure 2:
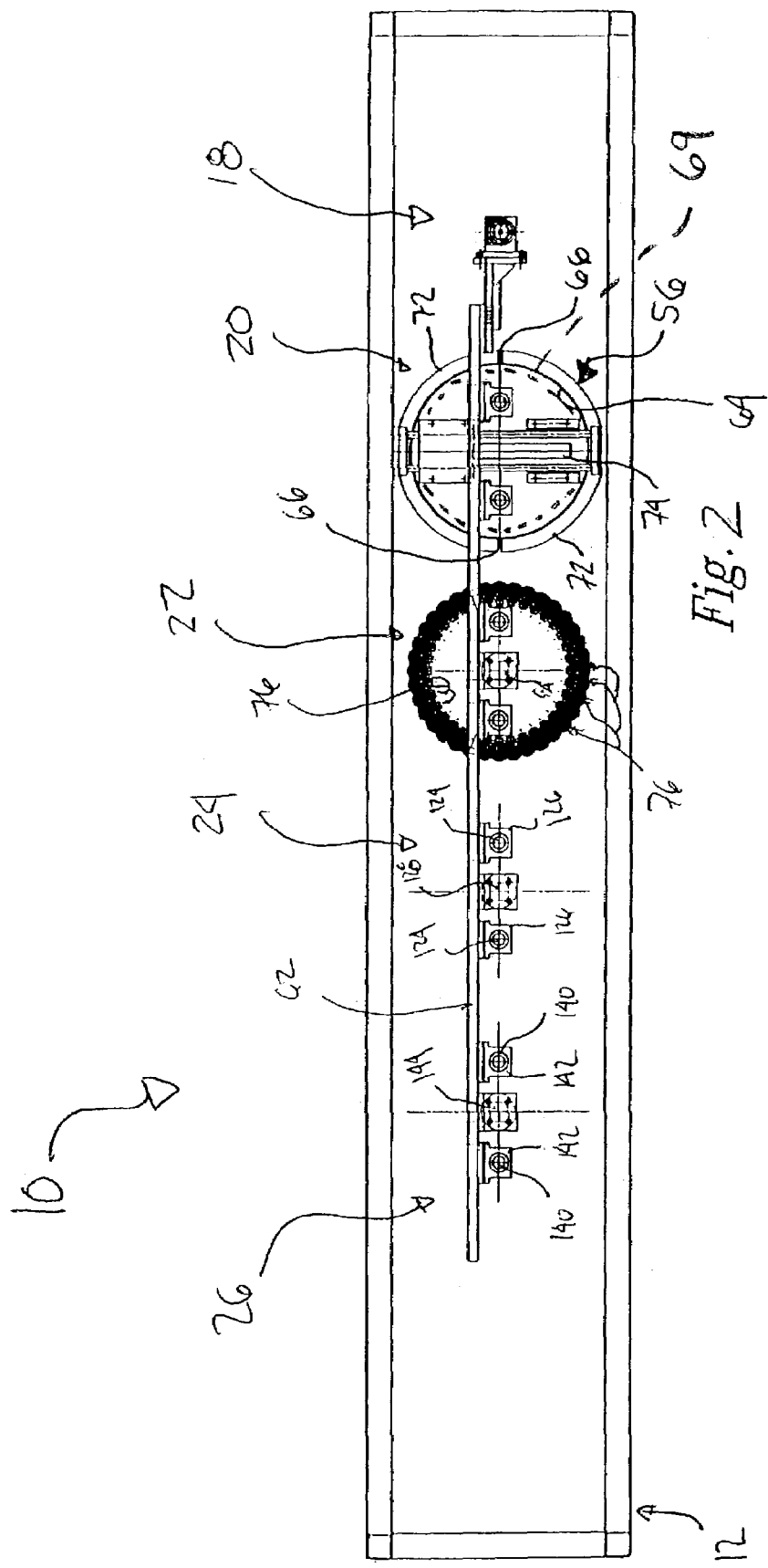
FIG. 2 is a top plan view of the apparatus of FIG. 1.

After having been properly placed within the luminous circle projected on the belt 28, the sheet of dough D is advanced to the cutting station 20. The cutting station 20 includes a vertically movable overhead blade assembly 56. The overhead blade assembly 56 includes a pair of rods 58 slidably mounted in two linear bushings 60 provided on a support structure 62 located at a given elevation over the conveyor belt 14. As shown in FIG. 2, a circular cutting blade 64 with a pair of diametrically opposed linear wings 66 projecting respectively towards the upstream and downstream ends of the apparatus 10 along a central axis thereof is mounted to a tool holder 68 (FIG. 1) which is, in turn, securely mounted to the distal lower ends of the rods 58. A pneumatic cylinder 70 (FIG. 1) or the like is provided for vertically displacing the tool holder 68 and, thus, the circular blade 64 towards to and away from the underlying sheet of dough D on the belt 28. The vertical movement of the tool holder 68 is guided by the rods 58 in the bushings 60. A pair of radially extendible/contractible semi-circular ejectors 72 are mounted about the circular cutting blade 64 to remove from the belt 28 the excess dough extending about the cutting blade 64 after the dough sheet D has been cut down. A pair of pneumatic cylinders, one of which is shown at 74 in FIG. 2, extends between the semi-circular ejectors 72 for controlling the operation thereof. The tool holder 68 also carries an annular stamping member 69 concentrically disposed within the circular cutting blade 64 to leave a circular indentation I (FIG. 3) or fold line in the dough while the same is being cut by the blade 64. According to a preferred embodiment of the present invention, the annular stamping member 69 is spaced inwardly from the circular cutting blade 64 by a distance of ½ inch. It is understood that the annular stamping member is slightly vertically recessed in the bottom face of the tool holder 68 relative to the circular blade 64 to ensure that the annular stamping member 69 has a penetration depth into the dough that is less than that of the circular cutting blade 64. The annular stamping member is vertically adjustable to prevent the sheet of dough from being cut by the stamping member. The annular stamping member 69 is preferably made of Nylon.

In operation, the overhead blade assembly 56 is lowered onto an underlying sheet of dough so that the circular cutting blade 64 cuts the sheet of dough and the annular stamping member creates a circular indentation I in the dough at a distance inwardly of the cutting line. Then, the ejectors 72 moves radially outwardly to remove the excess dough at the periphery of the sheet of dough D and the overhead assembly 56 moves vertically upwardly away from the conveyor belt 14 to a stand-by position before being lowered once again for the next sheet of dough.

After having been cut to the proper size, the sheet of dough D is moved to the folding station 22 whereat the peripheral edge of the sheet of dough is folded over inwardly about the indentation I formed therein so as to form a peripheral Z-shaped fold in the sheet.

Figure 3:
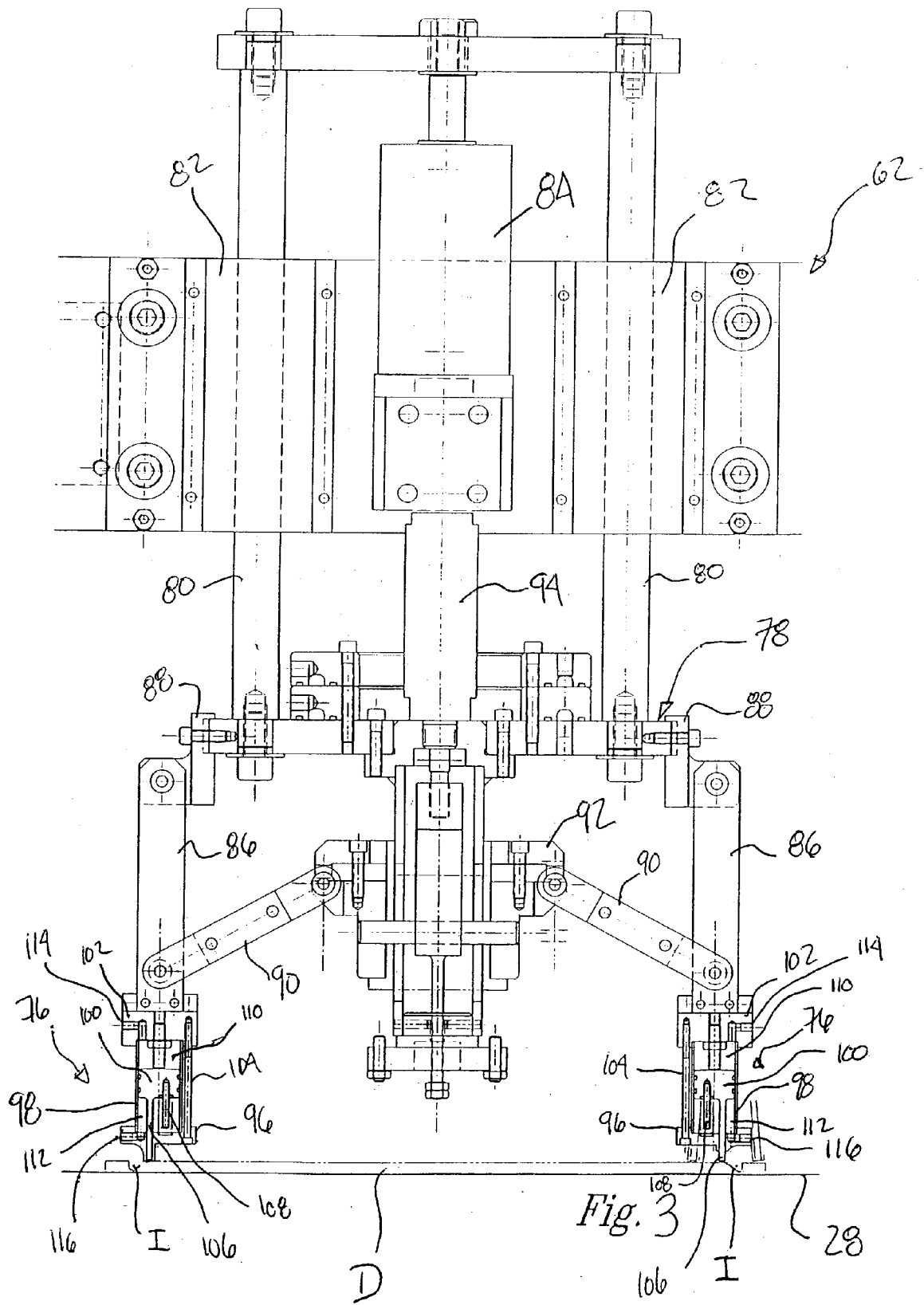
FIG. 3 is an enlarged elevation view of a folding station forming part of the apparatus of FIG. 1.

The folding station 22 generally comprises a plurality of circumferentially distributed suction members 76 (FIGS. 2 and 3) mounted on a linkage structure depending from the circumference of a horizontal mounting disc 78. According to a preferred embodiment of the present invention, there are 32 suctions fingers 76. As best shown in FIG. 3, the mounting disc 78 is fixed to the lower ends of two guiding rods 80 mounted for vertical movement in a pair of linear bushings 82 forming part of the support structure 62. A pneumatic cylinder 84 is provided on the support structure 62 for vertically displacing the disc 78 and, thus, the suction members 76 towards and away from the belt 28.

Each suction member 76 is mounted at the lower end of an arm 86. The arm 86 is pivotally mounted at an opposed upper end thereof to a bracket 88 fixed to the circumferential edge of the mounting disc 78. The lower end portion of each arm 86 is pivotally connected via a link 90 to a vertically movable hub structure 92 depending from a central portion of the mounting disc 78. The link 90 is pivotally connected at a first end thereof to the arm 86 and at a second opposed end thereof to the hub structure 92. This linkage structure allows the arms 86 to pivot conjointly about their respective pivot axes in response to a vertical movement of the hub structure 92 relative to the disc 78, thereby allowing increasing or reducing the diameter of the circle defined by the suction members 76. A pneumatic cylinder 94 is provided for vertically moving the hub structure 92 relative to the mounting disc 78.

As shown in FIG. 3, each suction member 76, includes an end fitting 96 mounted at a lower end of a hollow cylinder 98, a piston 100 mounted for sliding movement within the cylinder 98, and a cover 102 mounted to the lower end of the arm 86 for closing the upper end of the cylinder 98. The end fitting 96, the cylinder 98 and the cover 102 are structurally attached together by threaded fasteners, such as the ones illustrated at 104. The piston 100 has a stem portion 106 adapted to extend outwardly of the end fitting 96 through a passage defined therein. A spring 108 is provided within the cylinder 98 for normally urging the piston 100 upwardly to a retracted position wherein the stem portion 106 of the piston 100 is withdraw from the passage in the end fitting 96. The interior of the cylinder 98 defines a chamber that is divided into first and second chambers 110 and 112 by the piston 100. The first chamber 110 is connected to an air compressor (not shown) via a port 114. The second chamber 112 is operatively connected to a pump (not shown) via a port 116. The pump is preferably mounted within the frame 12 underneath the conveyor belt 14. A number of slots (not shown), for instance four, are defined in the end fitting 96 for connecting the passage, the second chamber 112 and the port 116 in fluid flow communication, thereby allowing the second chamber 112 to be used as a vacuum chamber.

In use, the pump is powered to withdraw air from the second chamber 112 via port 116 of each suction member 76. While air is being drawn out of the second chamber 112, the piston 100 of each suction member 76 is biased to its retracted position so as to clear the passage in the end fitting 96. Also, the pneumatic cylinder 94 is operated to position the suction members 76 along a circle generally corresponding to the peripheral edge portion of the underlying sheet of dough, i.e. outwardly of the indentation I previously defined therein by the annular stamping member. The pneumatic cylinder 84 is then operated to lower the mounting disc 78 and, thus, the suction members 76 onto the sheet of dough D. Once the peripheral portion has been grasped by the suction members 76 due to the vacuum effect, the pneumatic cylinder 84 is operated to lift the peripheral portion of the sheet of dough D from above and the pneumatic cylinder 94 is operated to pivot the arms 86 inwardly so as to displace the suction members 76 radially inwardly. This combination of movements results in the creation of a Z-shaped fold at the periphery of the sheet of dough D. Thereafter, the pneumatic cylinder 84 is operated to displace the mounting disc 78 and the suction members 76 downwardly, the source of vacuum is shut down and the pistons 100 are displaced to their extended positions against the biasing force of the springs 108 so as to cause the stem portions 106 of the pistons 100 to project outwardly of the end fittings 96 in order to press the three-ply fold in a way such that the same maintains its configuration after the pressure exerted thereon has been released. The pistons 100 are moved to their extended position by pressurized air fed by the air compressor into the first chambers 110 through port 114. Once the three-ply fold has been formed at the periphery of the sheet of dough D, the same is moved to the next station, namely: the rolling station 24.

At the rolling station 24, the three-ply fold formed at the periphery of the sheet of dough D is rolled upon itself to form a double fold on the periphery of the sheet of dough D.

As shown in FIG. 1, the rolling station 24 generally comprises a plurality of circumferentially distributed fingers 118 connected to each other by means of a flexible latex cord 119. According to a preferred embodiment of the present invention, the plurality of fingers 118 includes 28 fingers having a 1-inch width. Each finger 118 is mounted to the lower end of an arm 120 which is, in turn, pivotally mounted to the outer circumference of a mounting disc 122. The mounting disc 122 is secured to the lower ends of a pair of guiding rods 124 mounted for vertical sliding movement in a pair of bushings 126 forming part of the support structure 62. The vertical movement of the mounting disc 122 and, thus, of the fingers 118 is controlled by a pneumatic cylinder 128. The lower end portion of each arm 124 is connected via a link 130 to a vertically movable hub structure 132 depending from a central portion of the mounting disc 122. The link 130 is pivotally connected at a first end thereof to the arm 120 and at a second opposed end thereof to the hub structure 132. This linkage structure ensures that the arms 124 will pivot conjointly at unison about their respective pivot axes in response to a vertical movement of the hub structure 132 relative to the disc 122, thereby allowing increasing or reducing the diameter of the circle defined by the fingers 118. A pneumatic cylinder 134 is provided for vertically displacing the hub structure 132 relative to the mounting disc 122 and, thus, cause the arms 120 to rotate inwardly or outwardly about their respective pivot axes.

In operation, the mounting disc 122 is lowered to position the fingers 118 outwardly about the outer edge of the sheet of dough D. Then, the cylinders 128 and 134 are conjointly operated to raise the mounting disc 122 and pivot the arms 120 radially inwardly so as to roll the tree-ply fold inwardly upon itself.

From the rolling station 24, the sheet of dough is moved to the pressing station 26. As shown in FIG. 1, the pressing station 26 includes a central disc 138 securely mounted at the lower end of a pair of guiding rods 140 slidably engaged in a pair of linear bushings 142 forming part of the support structure 62. A pneumatic cylinder 144 is provided for vertically displacing the central disc 138 towards and away from the conveyor belt 14. The vertical movement of the central disc 138 is guided by the guiding rods 140 in the bushings 142. The pneumatic cylinder 144 extends between the support structure 62 and a collar 146 adjustably mounted to the guiding rods 140. By varying the vertical position of the collar 146 on the guiding rods 140, it is possible to adjust the stroke of the central disc 138. A spring-loaded annular fence 148 is mounted to the central disc 138 for encircling the sheet of dough D when the central disc 138 is displaced to a lowered position thereof. The spring-loaded annular fence 148 is arranged so as to rest on the conveyor belt 14 when the central disc 138 is displaced to its lowered position. An annular die 150 is mounted to a downwardly facing surface of the central disc concentrically within the spring-loaded annular fence 148. The annular die 150 has an undersurface defining an annular recess (not shown) having a rounded shape generally corresponding to that of the contour ridge on the sheet of dough D. The annular die 150 is provided on an inner circumference thereof with a downwardly depending circumferential lip (not shown) to pinch the interior circumference of the contour ridge and, thus prevent the contour ridge from unrolling. Four circumferentially distributed pneumatic cylinders 152 are mounted on the central disc 138 to vertically displace the annular die 150 relative to the central disc 138.

In operation, the pneumatic cylinder 144 is activated to press down the central disc 138 onto the sheet of dough D with the spring-loaded annular fence 148 abutting against the belt 28 about the sheet of dough D so as to create an exterior barrier. The central disc 138 exerts a pressing force on the central portion of the sheet of dough D, while at the same time forming an interior barrier for the contour ridge at the periphery of the sheet of dough D. At the same time, the annular die 150 is pressed against the previously formed contour edge in order to confirm its shape and pinch the dough at its inner circumference, thereby ensuring the integrity of the contour ridge. Once the inner portion of the contour ridge has been pinched off, the pneumatic cylinder 144 is activated to displace the central disc 138 and the spring-loaded annular fence 148 upwardly away from the sheet of dough. During this operation, the pneumatic cylinders 152 are activated so as to press the annular die 150 on the dough to prevent the sheet of dough D from being lifted off the conveyor 14 with the central disc 138 and the spring-loaded annular fence 148.

After having been pressed at the pressing station 26, the sheet of dough D is moved to the downstream end of the conveyor belt 28 where the sheet of dough D is removed from the apparatus 10 for further processing.

The above-described manner of forming the contour ridge on the sheet of dough D advantageously allows for the contour ridge to rise during baking, thereby providing for the production of a pizza pie with a crispy crust, a good puffiness and a good taste.

Although a circular formed sheet of dough has been exemplified, it is understood that the present invention could be adapted to any shape of pizza dough, such as square or the like.

The invention claimed is:

1. An apparatus for use in the preparation of a rising crust from a sheet of dough having a peripheral edge portion, the apparatus comprising a dough manipulating unit for grabbing and lifting from above the peripheral edge portion of an underlying sheet of dough, the manipulating unit being inwardly contractible while holding the peripheral edge portion of the sheet of dough and movable downwardly while being in a contracted state to provide for the formation of a peripheral fold in the sheet of dough, wherein said dough manipulating unit includes a source of vacuum for grabbing the periphery of the sheet of dough by aspiration.

2. An apparatus as defined in claim 1, wherein said dough manipulating unit includes a plurality of suction members distributed along a contour line corresponding generally to the outline of the sheet of dough, said suction members being operatively connected to said source of vacuum, and wherein said suction members are movable so as to selectively reduce and increase a surface defined by said contour line.

3. An apparatus as defined in claim 2, wherein said suction members are mounted on a mounting member, said mounting member being vertically movable between a raised position and a lowered position for lowering said suctions members onto the sheet of dough.

4. An apparatus as defined in claim 3, wherein each suction member is mounted at a distal end of an arm pivotally mounted at a proximal end thereof to said mounting member, and wherein said arm is pivoted by a link pivotally connected to a vertically movable hub structure depending from the mounting disc for movement with respect thereto.

5. An apparatus as defined in claim 2, wherein each suction member includes an end fitting mounted at a lower end of a hollow cylinder in which a piston is slidably mounted, and wherein a suction hole is defined in said end fitting.

6. An apparatus as defined in claim 5, wherein said piston has a stem portion adapted to extend outwardly of the end fining through said suction hole thereof when said piston is displaced to an extended position thereof.

7. An apparatus as defined in claim 6, wherein a biasing member is provided for normally urging the piston away from the end fitting to a retracted position thereof.

8. An apparatus as defined in claim 5, wherein said cylinder defines a chamber which is divided into first and second chambers by the piston, the first chamber being connected to an air compressor, the second chamber being connected to a pump.

9. An apparatus as defined in claim 8, wherein said suction hole and said second chamber are connected in fluid flow communication.

10. An apparatus as defined in claim 1, further comprising a rolling station for receiving the sheet of dough from the dough manipulating unit, said rolling station comprising a plurality of fingers articulately connected to a vertically movable overhead member.

11. An apparatus as defined in claim 10, wherein said fingers are connected to each other by means of a flexible latex cord.

12. An apparatus as defined in claim 1, further comprising a pressing station for pinching the dough in order to prevent the peripheral fold from unrolling.

13. An apparatus as defined in claim 12, wherein said pressing station includes a central pressing member mounted for vertical movement, a die mounted at a periphery of a downwardly facing surface of the central pressing member, said die defining a recess having a shape generally corresponding to that of the peripheral fold on the sheet of dough, the die having a downwardly depending lip on an inner side of said recess for pinching the inner end of the peripheral fold.

14. An apparatus as defined in claim 13, wherein said die is movable relative to said pressing member so that said pressing member can be displaced away from the sheet of dough while the die is still engaged with the dough.

15. An apparatus as defined in claim 13, wherein a spring-loaded exterior fence is mounted for movement with said central pressing member about said die to act as an exterior barrier to limit outward spreading of the sheet of dough during pressing.

16. An apparatus as defined in claim 1, further comprising a conveyor for advancing successive sheets of dough through the apparatus, said conveyor being operated by an indexing mechanism adapted to cause the sheets of dough to be incrementally advanced by a predetermined distance, and a positioning station located at an upstream end of the conveyor fur ensuring that each sheet of dough be properly positioned on the conveyor, said positioning station including a laser source for illuminating a conveyor zone within which the sheets of dough are to be placed.

17. An apparatus as defined in claim 16, further comprising a cutting station located between said positioning station and said dough manipulating unit, said cutting station comprising a vertically movable overhead blade assembly, said blade assembly comprising a blade and an ejector for removing excess dough about the blade after the dough has been cut down.

18. An apparatus as defined in claim 17, wherein said blade assembly further includes a stamping member for making a fold line in the dough while the same is being cut by the blade.

19. An apparatus for use in the preparation of a rising crust from a sheet of dough having a peripheral edge portion, the apparatus comprising a dough manipulating unit for grabbing and lifting from above the peripheral edge portion of an underlying sheet of dough, the manipulating unit being inwardly contractible while holding the peripheral edge portion of the sheet of dough and movable downwardly while being in a contracted state to provide for the formation of a peripheral fold in the sheet of dough, farther comprising a rolling station for receiving the sheet of dough from the dough manipulating unit, said rolling station comprising a plurality of fingers articulately connected to a vertically movable overhead member.

20. An apparatus for use in the preparation of a rising crust from a sheet of dough having a peripheral edge portion, the apparatus comprising a dough manipulating unit for grabbing and lifting from above the peripheral edge portion of an underlying sheet of dough, the manipulating unit being inwardly contractible while holding the peripheral edge portion of the sheet of dough and movable downwardly while being in a contracted state to provide for the formation of a peripheral fold in the sheet of dough, further comprising a conveyor for advancing successive sheets of dough through the apparatus, said conveyor being operated by an indexing mechanism adapted to cause the sheets of dough to be incrementally advanced by a predetermined distance, and a positioning station located at an upstream end of the conveyor for ensuring that each sheet of dough be properly positioned on the conveyor, said positioning station including a laser source for illuminating a conveyor zone within which the sheets of dough are to be placed.

* * * * *